Sept. 20, 1949.  V. E. LEAS  2,482,117
SLIDE SHIFTER FOR PROJECTORS
Filed July 25, 1946  2 Sheets-Sheet 1

INVENTOR
VERNON E. LEAS
BY William D. Hall
ATTORNEY

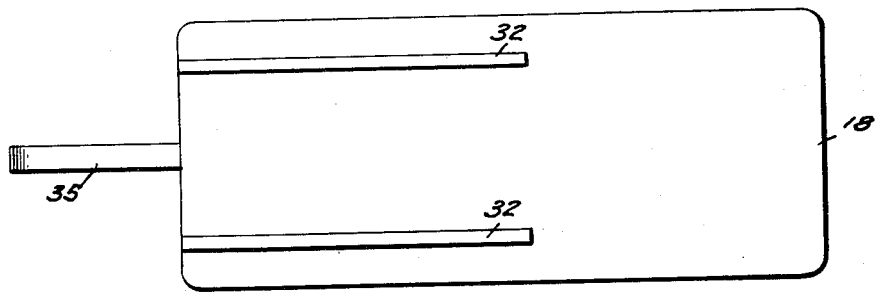
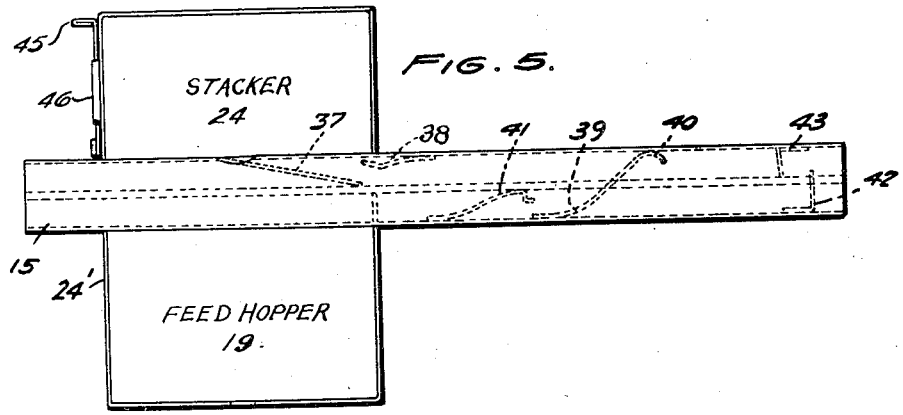
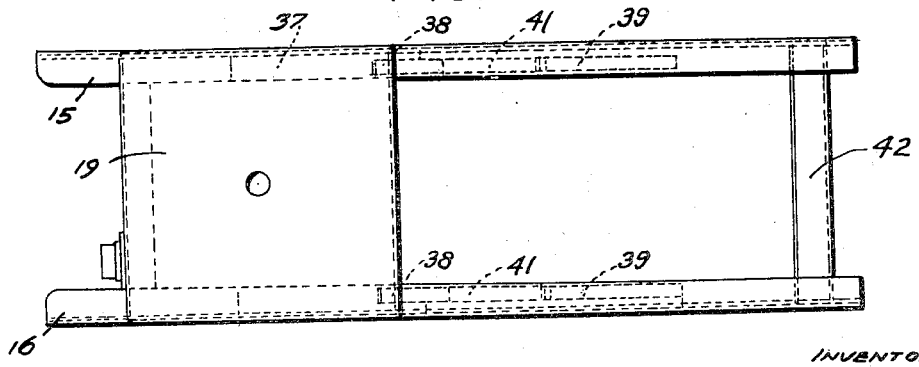

Patented Sept. 20, 1949

2,482,117

UNITED STATES PATENT OFFICE 2,482,117

SLIDE SHIFTER FOR PROJECTORS

Vernon E. Leas, Minneapolis, Minn.

Application July 25, 1946, Serial No. 686,091

2 Claims. (Cl. 88—28)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to slide projectors and more particularly to mechanisms for the feeding and extraction of transparent slides in a slide projector.

My invention seeks to provide novel means for feeding the slides consecutively from a stack into the projection position one by one in their proper order and for automatically extracting the viewed slide as a new slide is placed in the projection position.

It is an object of my invention to provide a novel slide feed extractor and stacker.

It is still another object of my invention to provide a slide feed mechanism that will simultaneously extract a slide from the projection position while a new slide is being moved into the projection position, by one operation of a single shifter.

The above and other objects and advantages will become readily apparent when the following specification is read in conjunction with the accompanying drawings in which:

Fig. 4 is a front view of the slide carrier;

Fig. 5 is a top view of the slide carrier track and the hopper and stacker withdrawn from the projection housing, the follower plate and mounting thereof omitted; and Fig. 6 is a front view of the unit shown in Fig. 5.

Figure 1:
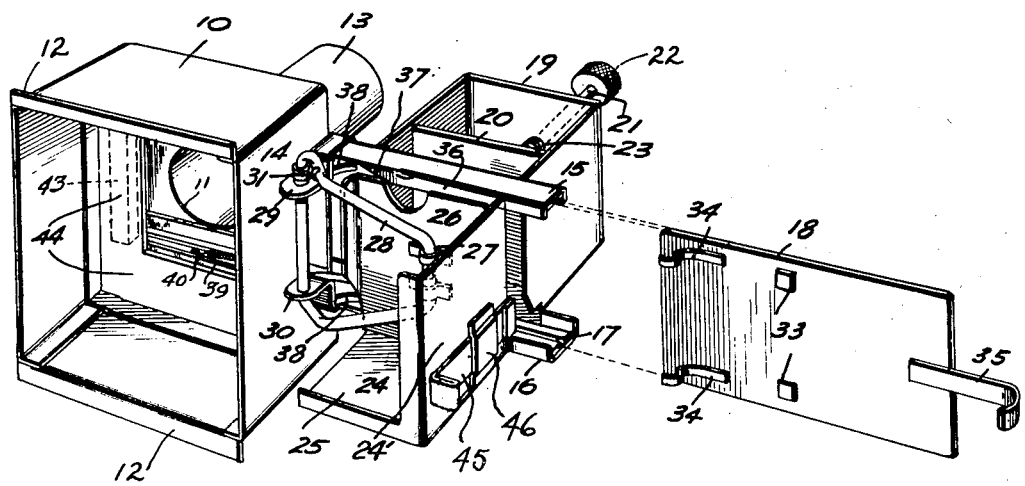
Fig. 1 is a perspective view of a device embodying my invention.

Referring to Fig. 1 it is seen that the reference numeral 10 refers to a projection housing having an exposure or projection opening 11 in the front wall thereof. A pair of flanges 12 enable the housing 10 to be mounted on a structure enclosing a strong light source not shown. Projecting from the front of the housing 10 is a lens barrel 13. Projecting from the right hand side 14 of the housing 10 and extending into the housing a proper distance, there is a slide carrier track comprising an upper channel section 15 and lower channel section 16. Each track section 15 and 16 is provided with a central groove 17 for the purpose of guiding and retaining a slide carrier 18, which consists principally of a planiform thin sheet metal plate set in the grooves and slidable from an outer retracted position with its inner end portion stopping at or adjacent the housing to an inner limit in which the plate extends across the projection opening 11.

Rigidly mounted in the front of the two slide tracks 15 and 16 is a feed hopper or box 19 open at the top, in which the slides to be shown or viewed are stacked in the order in which it is desired to view or project them, the first slide being at the inner or rear end of the box. In order to provide an automatic feed action for the transparent slides which are to be fed into the projector, the feed hopper 19 is provided with a pressure plate or follower 20 which is centrally mounted upon a rod 21 passing slidably through the front wall of the feed hopper 19, the protruding end of which has mounted thereon a knob 22. The pressure plate 20 is urged rearwardly into operative position by a coil spring 23 mounted upon the rod 21, and seated against the front wall of the hopper.

Rigidly mounted upon the rear side of the two slide tracks 15 and 16 is a receiver and stacker section 24 for the extracted slides comprising a side wall 24' and a bottom wall 25. As will be described in more detail later, the transparent slides which are extracted from the projection position one by one are automatically drawn into and stacked in consecutive order in the stacker. To aid in stacking the transparent slides and to maintain them in proper position there is provided a stacker plate 26 which is pivotally mounted at 27 upon a cranelike swivel arm 28. The swivel arm 28 is mounted on two hinges 29 and 30 situated at the housing 10 adjacent the upper and lower slide carrier tracks 15 and 16 respectively. In order to retain the used slides in a compact pile the stacker plate 26 is urged forwardly by a torsion spring 31 coiled upon a pivot part of the swivel arm 28.

Figure 2:
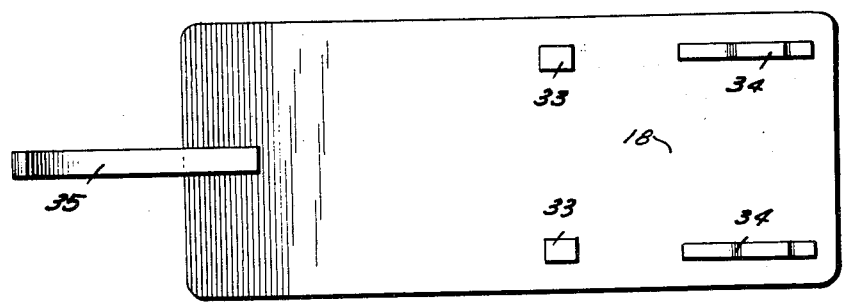
Fig. 2 is a back view of the slide carrier or shifter of the device illustrated in Fig. 1.
Figure 3:
Fig. 3 is a top view of the slide carrier.

Referring to Figs. 2, 3 and 4, the front side of the slide carrier 18 is provided with two horizontally extending spaced rails 32 (see Fig. 4) extending along its outer half and a short distance past the midlength of the slide carrier 18. The rails 32 are set above the surface of the slide 18 a distance sufficient so that the inner ends thereof will contact the edge of a transparent slide facing the slide carrier 18 in the feed hopper 19 when the carrier is at the outer limit of its movement. The back of the slide carrier 18 is provided with two vertically spaced pads 33 (see Fig. 2) situated on the inner half of the carrier past the mid-point of the longitudinal dimension of the slide carrier. The two pads 33 are small rectangular pieces of metal or other suitable material vertically aligned as shown in Fig. 2. Spaced apart in similar fashion to the two pads 33 and situated close to the inner end of the slide carrier 18 are two leaf springs 34, the purpose of which will be more fully described later in this specification. The slide carrier 18 is provided with a handle 35 centrally mounted on its outer end to enable manual reciprocation of the slide carrier for feeding, extracting and stacking transparent slides in the projector.

Figs. 5 and 6 give a detailed illustration of the slide carrier track construction and from these figures it is seen that the tracks 15 and 16 extend the full width of the housing 10. The upper and lower tracks 15 and 16 are each provided on the rear side flange portion thereof, or stacker side with a horizontal guide rail or flange 36 which is struck and bent inwardly (forwardly) as at 37 to form an opening and a diagonal leaf spring, the free end of the spring projected toward the left, and bearing constantly on the shifter 18 to serve as a switch to divert slides into the stacker as they are retracted from projection position. On the rear side flange of each track 15 and 16 close to the housing 10 and beside the stacker space there is a stacker tension spring 38 which is a leaf spring having its free end inclined forwardly and toward the right close to the free end of spring 37, but not extended as far forward as the latter, located in that portion of each track 15 and 16 abutting the stacker. Situated farther toward the left along the front flange of each track 15 and 16 is an elongated bent pressure spring 39 which is so formed that it extends diagonally toward the left across the track, and a recurved end 40 thereof contacts the rear section of the track as shown in Fig. 5. Also situated on the front of each track 15 and 16, before the pressure spring 39, is a backstop spring 41 bent in such fashion that its free end extends toward the left and also rearwardly halfway across the track as shown in Fig. 5.

Mounted on the two sliding tracks 15 and 16 close to the left ends thereof within the housing 10, is a slide carrier stop 42 formed of an L-shaped member vertically disposed between the two slide carrier tracks. At a distance farther inward toward the right along the tracks 15 and 16 and mounted on the rear portion of said tracks, is a similar stop or buffer element 43, utilized as a stop for the transparent slides. It should be noted that the stop 43 has a flange extending forwardly approximately half way across the track and that this flange is also slightly inclined toward the left at its forward free edge.

Situated within the housing 10 there is a mask or template 44 coincident with the rear sides of tracks 15—16 against which the transparent slides to be projected or viewed are held by the springs 39—40 in a manner to be described later.

In order to prevent accidental withdrawal of the slide carrier 18 from the device a sliding latch bolt 45 held in place by a strap 46 is mounted upon the side wall 24 of the stacker. It may extend forward half way across the clear way in tracks 15—16, where, when the bolt is in latched position, on outward movement of the slide the lower pad 33 will strike the latch bolt, stopping the slide at the proper outer limit of the movement. To withdraw the slide carrier 18 from the device it is only necessary to pull the latch 45 rearwardly and the slide carrier may then be removed from the device.

The operation of my device will now be described in detail. The transparent slides to be viewed or projected are first placed in the order in which it is desired they be projected in the feed hopper 19 by moving the plate 20 forwardly. This is done by grasping the knob 22 on the front of the said hopper and pulling the pressure plate 20 forwardly to permit the transparent slides to be placed in the feed hopper. The knob 22 is released, permitting the spring 23 to expand and pressure plate 20 to contact the outermost slide and to cause pressure to be exerted rearwardly upon the entire stack of slides. By means of the handle 35, the slide carrier 18 is then pulled to its outermost position where it is stopped by bolt 45. The slide carrier 18 is then pushed inwardly with the result that the edges of the slide carrier rails 32 engage the near vertical edge of, and guide one transparent slide from the feed hopper 19 as the springs 34 move it into the housing 10 until the slide carrier 18 strikes the stop 42. In this position the backstop spring 41 will have snapped rearward close beside the slide and will prevent the transparent slide from being pulled out when the slide carrier 18 is retracted. At the full "in" position of the slide carrier 18 the upper and lower pressure springs 39 press the transparent slide against the slide carrier 18. When the slide carrier 18 is retracted to its full out position, the ends 40 of the two pressure springs 40 push the transparent slide to the rear sides of the tracks 15—16 and up against the mask or template 44 the innermost vertical edge of the slide engaging the inclined flange of the buffer 43. An image of the transparent slide is then projected on the screen, the slide thus being in the projection position. With the slide carrier 18 in its full "out" position, it is ready to pick up another slide as before the next time it is pushed to its full "in" position. When the slide carrier 18 is pushed to its full "in" position, the second time, it carries a second transparent slide along in the same manner just described. At the same time, the two extracting springs 34, located on the back of the slide carrier, slide over the transparent slide already in the projection position and catch over the trailing or far inner vertical edge of the latter slide just as the carrier 18 reaches its left hand limit of travel inward. At this point there is one transparent slide behind the carrier in the back of the tracks 15 and 16 and one transparent slide before the carrier in the front of the tracks. When the carrier 18 is now retracted to its full "out" position, the extracting springs 34 pull the rear transparent slide out with it, moving the slide along the tracks until it contacts the two leaf springs 37 on guides 36, which guide the transparent slide into the stacker. At the same time, the back stop springs 41 are retaining the front transparent slide and the pressure springs 39 are forcing it to the back of the tracks 15 and 16 against the slide stop or buffer 43 and mask 44 into the projection position. The stop 43 receives the advancing vertical edge of the slide thereagainst, and the slide will be cammed toward the right to proper display position as the spring 39 presses the slide rearwardly against the inclined flange of the stop 43 when the carrier is withdrawn.

The above sequence of events is repeated each time the carrier 18 is moved from its full "out" position to its full "in" position. One transparent slide is fed on the "in" stroke of the slide and held in projection position while the transparent slide already in the projector in the projection position is extracted and stacked in proper consecutive order upon the retraction of the carrier 18.

It will be observed that as each new slide is brought before the display position while another is in display position, the end portion of the shifter moves with it across the window 11, thus serving as a shutter closing the opening over that part where the two slides overlap, so that confusion of two images on the series will be avoided and the projected beam will be cut off for as long as desired before the new slide is projected.

Thus, it is seen that I have provided a slide projector feed mechanism that will feed transparent slides in the desired consecutive order to projection position and extract the already-projected slides and stack them in the desired order by mere reciprocation of the shifter, such operation taking place with a minimum of effort and attention on the part of the operator of the projector.

While I have described and illustrated one embodiment of my invention, it is obvious that many changes and modifications may be made by those skilled in the art without departing from the scope of the invention as set forth in the appended claims.

I claim:

1. In a projector of the character described wherein a projector housing is formed having a projection opening therein before which lantern slides are to be positioned, upper and lower parallel channel tracks above and below said opening and extending laterally through one side of the housing and beyond, a forward slide-holding rack opening from said tracks beside the housing constructed to hold a stack of slides to be displayed, means to press a stack therein toward the tracks, a receiving rack beside said housing opening from said tracks opposite the first mentioned rack, means to guide and stack slides therein when retracted slidingly from said housing, a shifter device slidable in said tracks from a retracted position between said two racks to an inner limit across said projection opening, means on one side of the shifter to engage the outer side edge of the first slide in the first named rack when the shifter is moved inward from retracted position, means on the inner end of the shifter to engage and retract a slide from before said projection opening when the shifter is moved from its said inner limit to retracted position and means to operate the shifter; wherein pads are formed on the rear face of the said shifter positioned to receive thereagainst a slide in said tracks at the rear of the shifter while the latter is at the inner limit of its movement, and the rear sides of said tracks before the receiving rack are interrupted to receive a slide edgewise therethrough when retracted along the tracks from the housing, a leaf spring being fixed rearwardly of the track adjacent the outer side of said interruption and inclined forwardly and toward the housing to bear wipingly against the rear side of the shifter throughout reciprocation of the latter so as to enter between the shifter and a retracted slide.

2. The structure of claim 1 wherein a stop is provided between the tracks to limit inward movement of the shifter, and at the rear side of the space between the tracks a slide stop of limited vertical dimension inclined from a line representing the inner limit of a slide in position for projection, and away from said position longitudinally of the tracks, whereby to receive thereagainst the inner vertical edge of a slide when pressed from the forward sides of said tracks toward the rear sides of the tracks and to cam the slide toward exact projection position when inserted too far, said means on the inner end of the shifter to engage and retract a slide being out of line with the last-named stop in reciprocation of the shifter.

VERNON E. LEAS.

REFERENCES CITED

The following references are of record in the file of this patent:

UNITED STATES PATENTS

| Number | Name | Date |
| --- | --- | --- |
| 586,245 | Riley | July 13, 1897 |
| 720,099 | Barbour | Feb. 10, 1903 |
| 786,883 | Edmonds | Apr. 11, 1905 |
| 946,501 | Force | Jan. 11, 1910 |
| 952,199 | James | Mar. 15, 1910 |
| 1,002,078 | Paoli | Aug. 29, 1911 |
| 1,159,681 | Kastner | Nov. 9, 1915 |
| 2,213,779 | Young | Sept. 3, 1940 |